United States Patent
Chen

(10) Patent No.: US 6,456,512 B1
(45) Date of Patent: Sep. 24, 2002

(54) METHOD FOR PULSE WIDTH MODULATION FREQUENCY CORRELATION

(75) Inventor: Jake Chen, Taipei (TW)

(73) Assignee: Allis Electric Co., Ltd., Taipei (TW)

( * ) Notice: Subject to any disclaimer, the term of this patent is extended or adjusted under 35 U.S.C. 154(b) by 0 days.

(21) Appl. No.: 09/826,937

(22) Filed: Apr. 6, 2001

(51) Int. Cl.[7] .......................... H02M 1/12; H02M 7/537
(52) U.S. Cl. ........................................ 363/41; 363/131
(58) Field of Search .......................... 363/41, 40, 78, 363/39, 79, 80, 81, 89, 95, 97, 127, 131; 323/282, 285, 288

(56) References Cited

U.S. PATENT DOCUMENTS 5,065,300 A * 11/1991 Jacobson et al. ............. 363/16
5,479,337 A * 12/1995 Voigt ........................... 363/131
6,292,378 B1 * 9/2001 Brooks et al. ................. 363/65

* cited by examiner

*Primary Examiner*—Rajnikant B. Patel

(57) ABSTRACT

A method for PWM frequency correlation of the present invention is disclosed. In that, 2×M PWM signals G1–Gn are supplied to control ends (gates) of the switch elements (such as MOSFET) Q1–Qn of the D. C. boost circuit, where M is a prime number larger than 1, and the PWM signals G1, G3, G5, . . . , Gn–1 are synchronous, and have a phase difference of 180 degrees/M, and the PWM signals G2, G4, G6, . . . , Gn are synchronous, and have a phase difference of 180 degrees/M. by this design, a ripple current and EMI interference to the battery as the PWM signal is switched are reduced.

3 Claims, 6 Drawing Sheets

METHOD FOR PULSE WIDTH MODULATION FREQUENCY CORRELATION

FIELD OF THE INVENTION

The present invention relates to a method for PWM (pulse width modulation) frequency correlation, and especially to a method of frequency modulation through PWM for reducing current ripple in a battery.

BACKGROUND OF THE INVENTION

In a general D. C. (direct current) boost circuit, the PWM signal (referring to the wave shapes of G1–G4 of FIGS. 1 and 2) outputted from two sets of push-pull PWM controller serves to push the MOSFETs (metal-oxide semiconductor field effect transistor) Q1–Q4, and then two transformers T1 and T2 serve to converter the voltage of a battery into a D. C. high voltage.

In the aforesaid structure, the odd PWM signals G1 and G3 are square waves of the same phases which are then inputted to the gates of the MOSFETs Q1, Q3, while the even PWM signals G2 and G4 are square 20 waves of the same phases which are then inputted to the gates of the MOSFETs Q2, Q4. Then, if the MOSFETs Q1–Q4 are triggered by the PWM signals G1–G4 and then are conducted, the working current flowing into the MOSFETs Q1–Q4 are illustrated as the triangular waves of I1–I4 of FIG. 2, while the synthetic current supplied from the battery V BAT is as that shown in I5 of FIG. 2.

From the amplitude (21) of the synthetic current and the D. C. component, it is known that the ripple is very large. Therefore, the inner resistor of the battery V BAT consumes a large amount of power. Even a filtering capacitor C parallel connected to the battery V BAT is burned. This is a problem can not be overcome.

SUMMARY OF THE INVENTION

Accordingly, the primary object of the present invention is to provide a method for PWM frequency correlation of the present invention is disclosed. In that, 2×M PWM signals G1–Gn are supplied to control ends (gates) of the switch elements (such as MOSFET) Q1–Qn of the D. C. boost circuit, where M is a prime number larger than 1, and the PWM signals G1, G3, G5, . . . , Gn−1 are synchronous, and have a phase difference of 180 degrees/M, and the PWM signals G2, G4, G6, . . . , Gn are synchronous, and have a phase difference of 180 degrees/M. By this design, a ripple current and EMI interference to the battery as the PWM signal is switched are reduced.

Another object of the present invention is to provide a method for PWM frequency correlation, wherein the ripple component to the battery is reduced effectively and thus, the effect of electromagnetic wave to conductive wires is reduced.

The various objects and advantages of the present invention will be more readily understood from the following detailed description when read in conjunction with the appended drawing.

DETAILED DESCRIPTION OF THE PREFERRED EMBODIMENTS

To further understand the present invention, a detail description of the present invention will be described in the following with the appended drawings. Those skilled in the art may completely understand the objects, characteristics and features of the present invention from these descriptions. However, those descriptions and the appended drawings are only used to describe the present invention instead of being used to confine the spirit and scope of the present invention defined in the appended claims.

Figure 1:
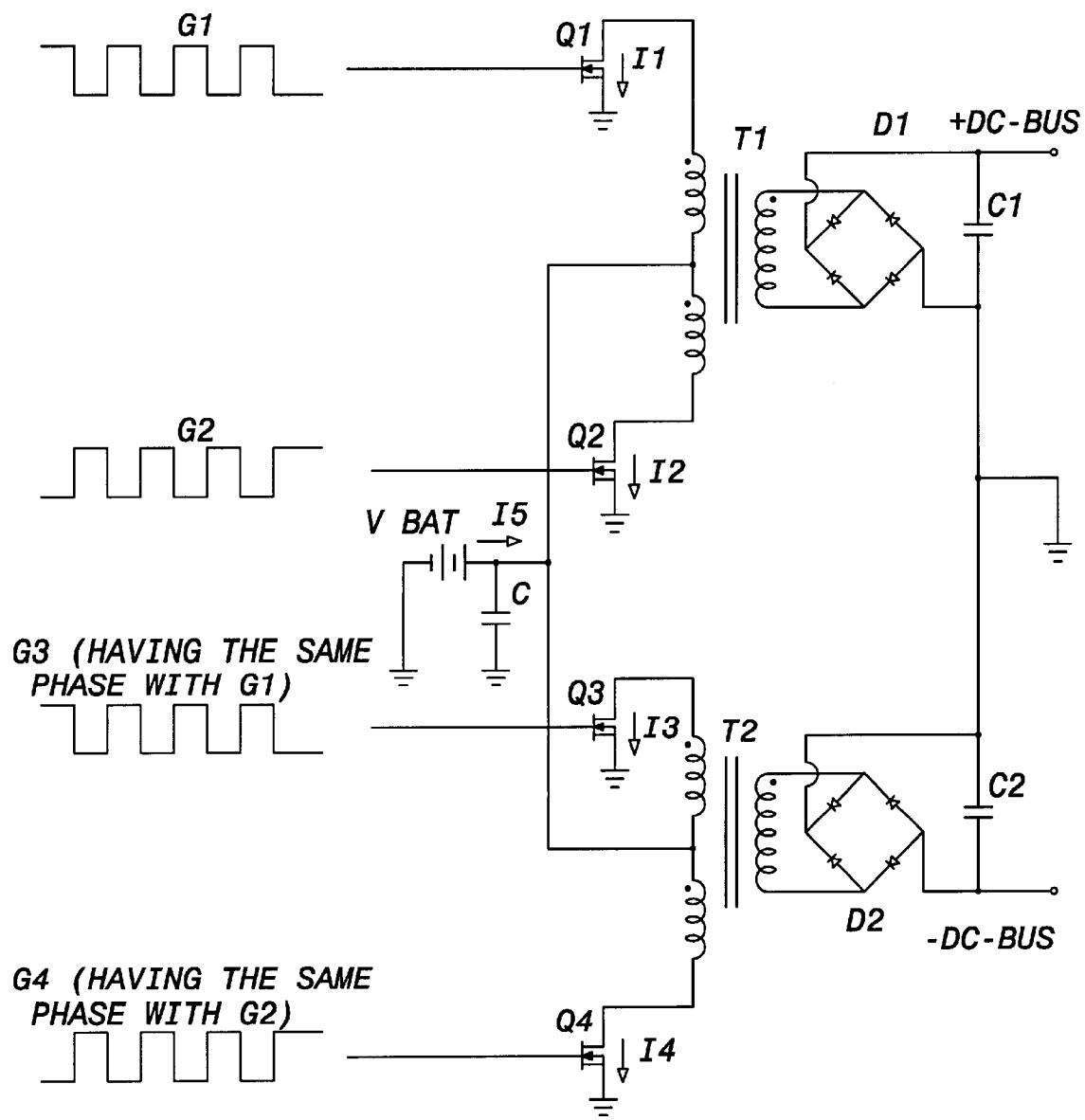
FIG. 1 is a schematic view of a conventional D. C. boost circuit.
Figure 2:
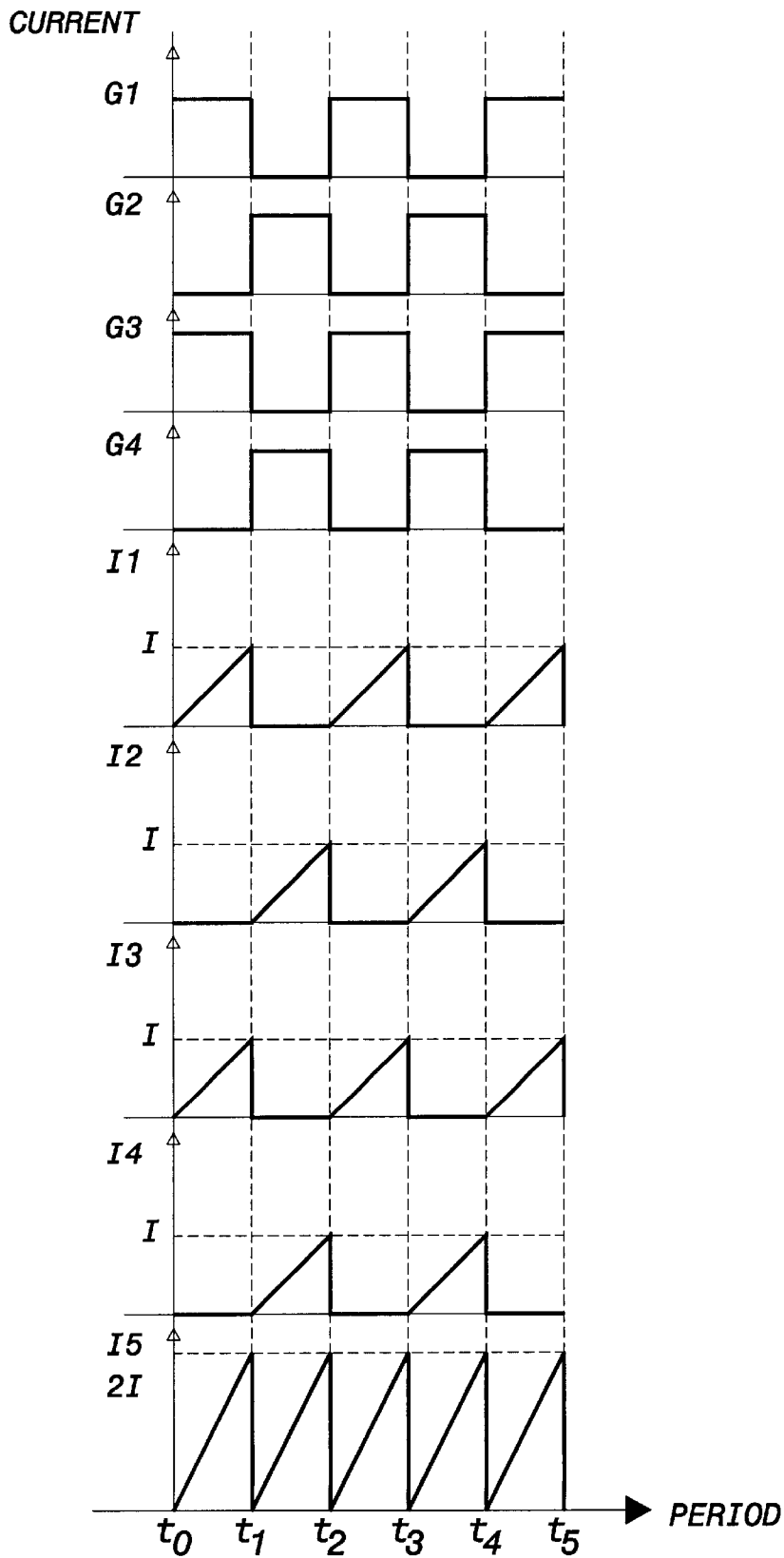
FIG. 2 shows the waveforms of the working current of the FIG. 1.
Figure 3:
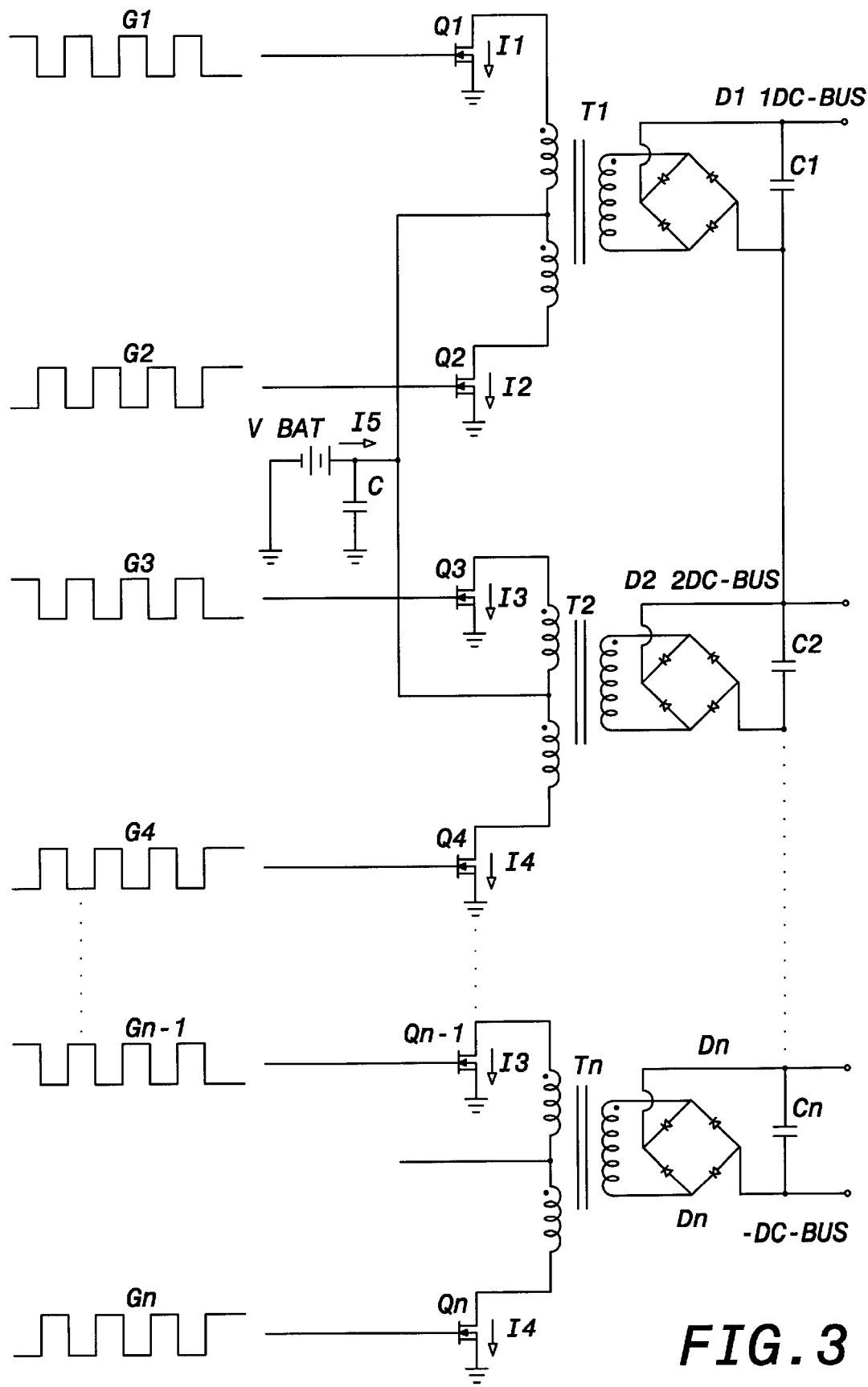
FIG. 3 is a schematic view showing that the PWM signal of the present invention is transferred to a MOSFET.

Referring to FIG. 3, the method for PWM frequency correlation of the present invention is illustrated. In the method for PWM frequency correlation of the present invention, 2×M PWM signals G1–Gn are supplied to control ends (gates) of the switch elements (such as MOSFET) Q1–Qn of a D. C. boost circuit, where M is a prime number larger than 1, such as 2, 3, 5, 7, 11, etc., and the PWM signals G1, G3, G5, . . . , Gn−1 are synchronous, and have a phase difference of 180 degrees/M, and the PWM signals G2, G4, G6, . . . , Gn are synchronous, and have a phase difference of 180 degrees/M.

That is, if M is equal to 2, then four PWM signals G1–G4 are transferred to the control end of the switch element Q1–Q4 of the D. C. boost circuit. The PWM signals G1 and G3 are synchronous and have a phase difference of 90 degrees and the PWM signals G2 and G4 are synchronous and have a phase difference of 90 degrees.

Similarly, if M is equal to 3, then six PWM signals (G1–G6) are transferred to the control end of the switch element of the D. C. boost circuit. The PWM signals G1, G3 and G5 are synchronous and have a phase difference of 60 degrees and the PWM signals G2, G4 and G6 are synchronous and have a phase difference of 60 degrees.

By this design, the ripple current and EMI interference to the battery as the PWM signal is switched is reduced.

Figure 4:
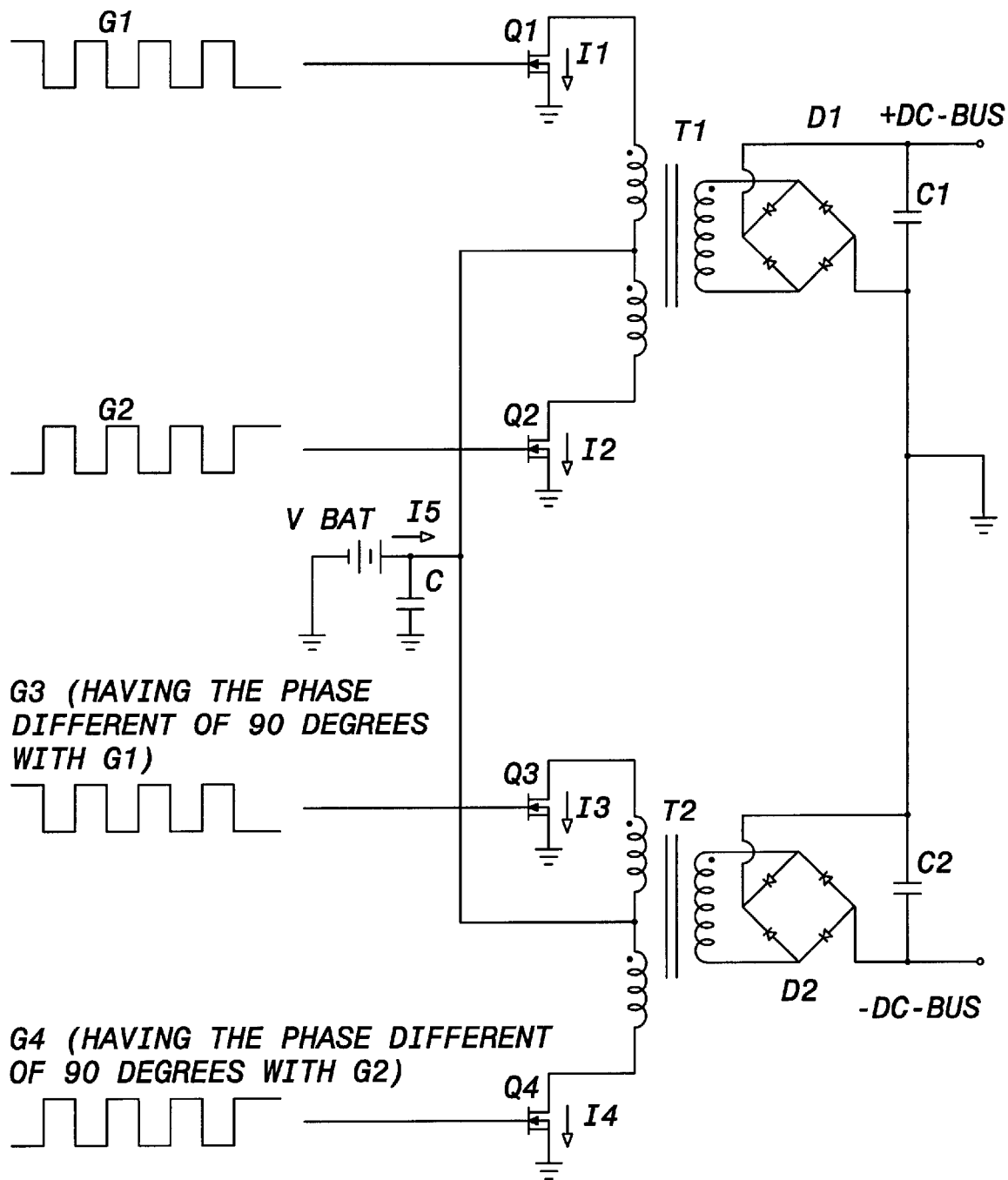
FIG. 4 is a schematic view showing the components of the D. C. boost circuit in the present invention.
Figure 5:
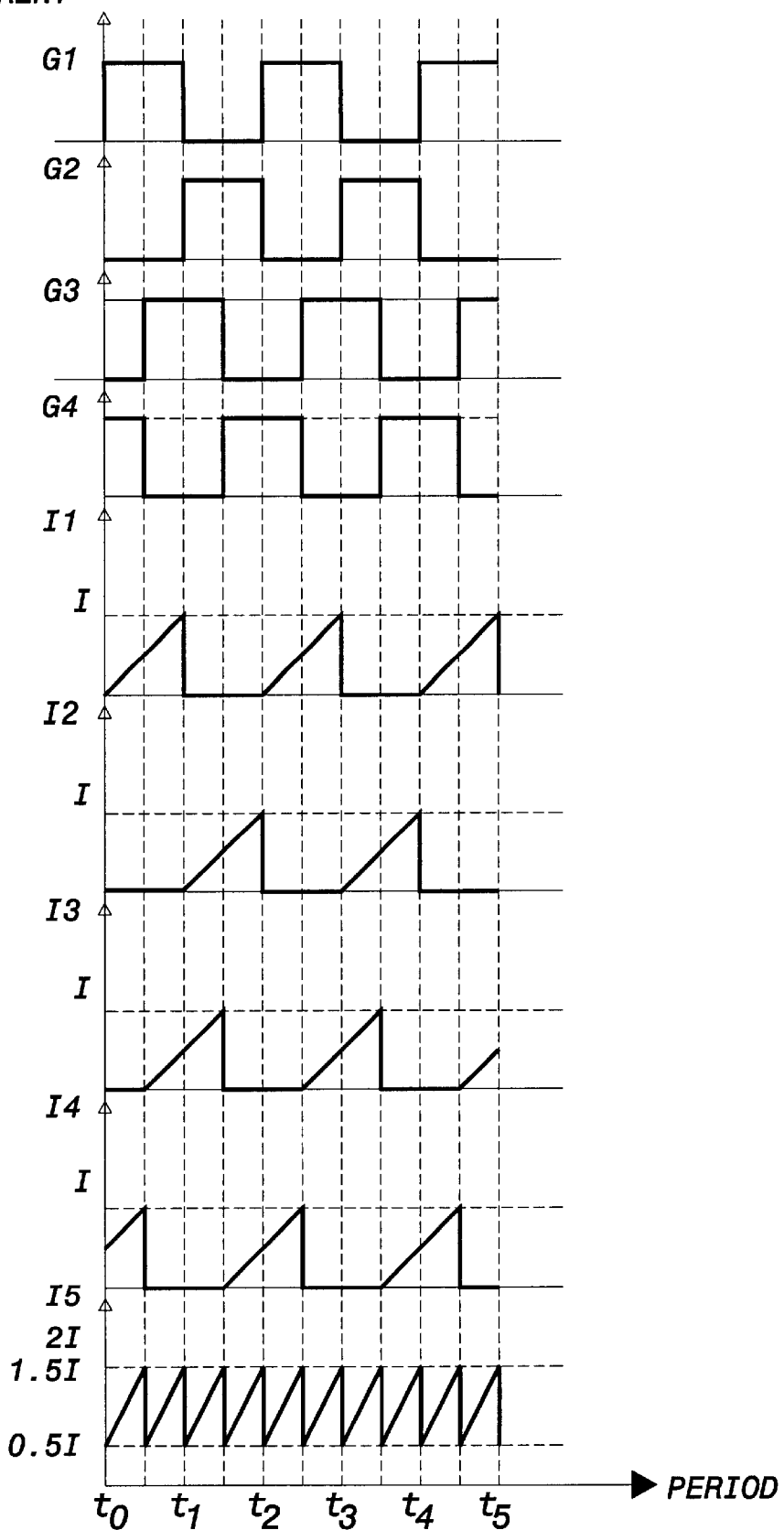
FIG. 5 shows the waveform the working current of FIG. 4 in the present invention.

Referring to FIGS. 4 and 5, an example of four PWM signals (G1–G4) is illustrated. These signals are transferred to the MOSFETs Q1–Q4 of the D. C. boost circuit 1. In that, the PWM signals G1 and G3 are synchronous and have a phase difference of 90 degrees and the PWM signals G2 and G4 are synchronous and have a phase difference of 90 degrees. I1 and I4 are the currents flowing into the MOSFETs Q1–Q4 and I5 is the sum current in the battery.

From the figure, it is appreciated that the ripple component and amplitude (1.5I) are smaller than those in the conventional case. It is known from the drawing that the sum current has a D.C. component of 0.5I, and the ripple component is one half of the original value.

Figure 6:
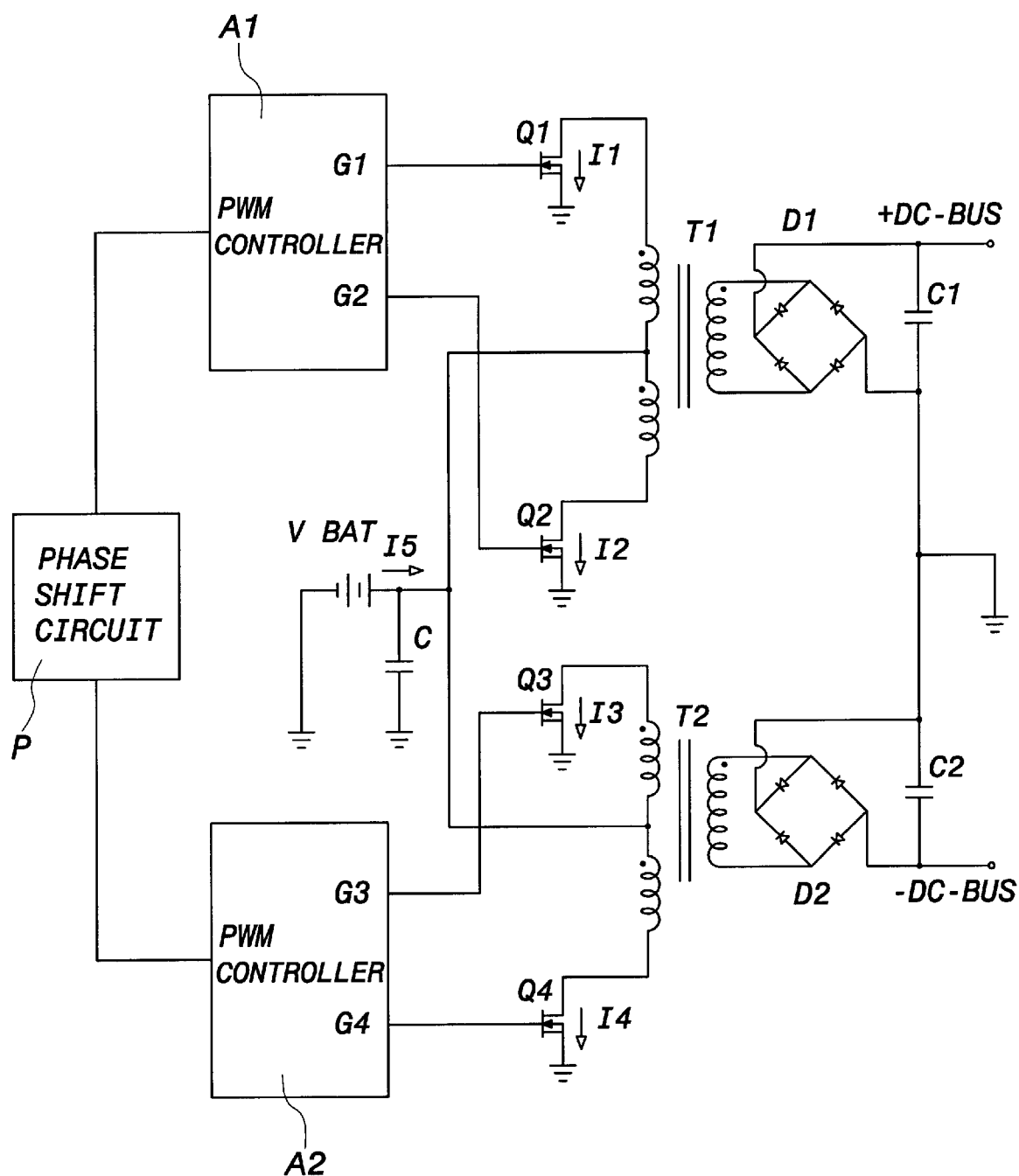
FIG. 6 shows a block diagram about the components of the D. C. boost circuit and a phase shift circuit in the present invention.

Referring to FIG. 6, in the present invention, the PWM signals G1–G4 transferred to the switch element Q1–Q4 of the D. C. boost circuit are achieved by the PWM controller A1 and A2 with a phase shift circuit P.

In summary, by the present invention, the ripple components to the battery are reduced effectively and the frequency of the ripple is increased to be M times of the original value. Therefore, the present invention is beneficial to the industrial application.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for PWM frequency correlation for reducing a ripple component of battery current supplied to a D.C. boost circuit, comprising the steps of:

supplying 2×M PWM signals to control ends of switch elements of the D.C. boost circuit, where M ia a prime number larger than 1, the 2×M PWM signals including odd PWM signals and even PWM signals;

synchronously supplying the odd PWM signals having a successive phase difference of 180 degrees/M therebetween; and synchronously supplying the even PWM signals having a successive phase difference of 180 degrees/M therebetween, wherein a ripple current and EMI interference of the battery current, as the PWM signal is switched, are reduced.

2. The method for PWM frequency correlation as claimed in claim 1, wherein the PWM signals transferred to the switch element of the D. C. boost circuit are achieved by PWM controllers with a phase shift circuit.

3. The method for PWM frequency correlation as claimed in claim 1, wherein the PWM signals transferred to the switch element of the D. C. boost circuit are achieved by programming of a software.

* * * * *